United States Patent
Yamane

(10) Patent No.: US 9,448,629 B2
(45) Date of Patent: Sep. 20, 2016

(54) MULTI-MODE TACTILE SENSATION PROVIDING DEVICE

(71) Applicant: KYOCERA CORPORATION, Kyoto (JP)

(72) Inventor: Takeshi Yamane, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 5 days.

(21) Appl. No.: 14/347,609

(22) PCT Filed: Sep. 26, 2012

(86) PCT No.: PCT/JP2012/006155
§ 371 (c)(1),
(2) Date: Mar. 26, 2014

(87) PCT Pub. No.: WO2013/046670
PCT Pub. Date: Apr. 4, 2013

(65) Prior Publication Data
US 2014/0232677 A1 Aug. 21, 2014

(30) Foreign Application Priority Data
Sep. 27, 2011 (JP) .................................. 2011-210895

(51) Int. Cl.
*G06F 3/041* (2006.01)
*G06F 3/01* (2006.01)
*G06F 3/048* (2013.01)

(52) U.S. Cl.
CPC .............. *G06F 3/016* (2013.01); *G06F 3/041* (2013.01); *G06F 3/048* (2013.01); *G06F 3/0414* (2013.01); *G06F 2203/04106* (2013.01)

(58) Field of Classification Search
CPC ..................... G06F 2203/04106; G06F 3/016; G06F 3/041; G06F 3/0414; G06F 3/048
USPC .......................................................... 345/173
See application file for complete search history.

(56) References Cited

U.S. PATENT DOCUMENTS

2003/0174121 A1   9/2003   Poupyrev et al.
2008/0052545 A1*  2/2008   Finkelstein et al. .......... 713/300

(Continued)

FOREIGN PATENT DOCUMENTS

JP   2003-288158 A   10/2003
JP   2008-130055 A   6/2008

(Continued)

OTHER PUBLICATIONS

An Office Action; "Notice of Reason for Rejection," issued by the Japanese Patent Office on Jun. 17, 2014, which corresponds to Japanese Patent Application No. 2013-535918 and is related to U.S. Appl. No. 14/347,609; with English language concise explanation.

(Continued)

*Primary Examiner* — Long D Pham
(74) *Attorney, Agent, or Firm* — Studebaker & Brackett PC

(57) ABSTRACT

Provided are a touch sensor (11), a pressure detection unit (12) that detects pressure on a touch face, a tactile sensation providing unit (13) that vibrates the touch face, a battery information acquisition unit (17) that acquires information on a battery, and a control unit (15) that switches between a first input mode, in which the control unit (15), upon the touch sensor (11) detecting contact, executes predetermined processing, and a second input mode, in which the control unit (15), upon data based on pressure detected by the pressure detection unit (12) satisfying a predetermined standard while the touch sensor (11) is detecting contact, controls the tactile sensation providing unit (13) to provide a tactile sensation and executes predetermined processing. The control unit (15) switches between the first input mode and the second input mode based on the information on the battery acquired by the battery information acquisition unit (17).

3 Claims, 8 Drawing Sheets

(56) References Cited

U.S. PATENT DOCUMENTS

| | | | |
|---|---|---|---|
| 2008/0122315 A1* | 5/2008 | Maruyama et al. | 310/314 |
| 2009/0015555 A1* | 1/2009 | Takashima et al. | G06F 3/016 345/158 |
| 2012/0154316 A1 | 6/2012 | Kono | |
| 2012/0262404 A1 | 10/2012 | Yamamoto et al. | |
| 2012/0299859 A1 | 11/2012 | Kinoshita | |

FOREIGN PATENT DOCUMENTS

| | | |
|---|---|---|
| JP | 2010-258553 A | 11/2010 |
| JP | 2011-048685 A | 3/2011 |
| JP | 2011-082623 A | 4/2011 |
| JP | 2011-129047 A | 6/2011 |
| JP | 2011-154559 A | 8/2011 |
| WO | 2011/077687 A1 | 6/2011 |

OTHER PUBLICATIONS

International Search Report; PCT/JP2012/006155; Oct. 23, 2012.

T.Horin et al, Dekiru Series Henshubu, Dekiru Pocket + Optimus bright, 1st edition, Impress Japan Corp, Jul. 1, 2011, pp. 182, 201.

Shitte Toku suru 'INFORBAR A01' no battery Setsuyakujutsu, [online], Jul. 1, 2011, Androvavi, [retrieval date Oct. 12, 2012], Internet <URL: http://andronavi.com/2011/07/101136>.

An Office Action; "Notice of Reasons for Rejection," issued by the Japanese Patent Office on Jan. 20, 2015, which corresponds to Japanese Patent Application No. 2013-535918 and is related to U.S. Appl. No. 14/347,609; with English language concise explanation.

\* cited by examiner

FIG. 2
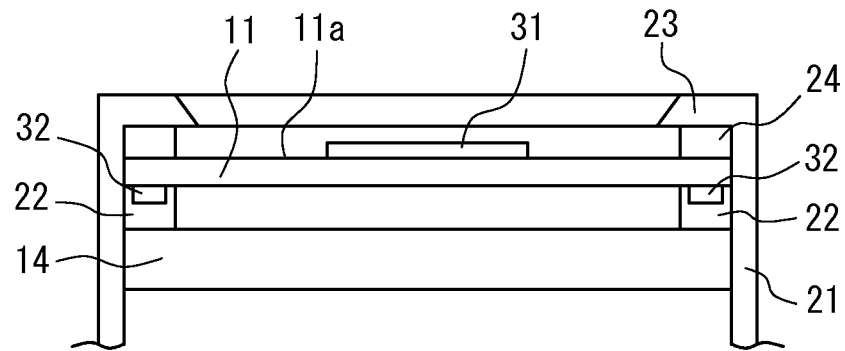
(a)
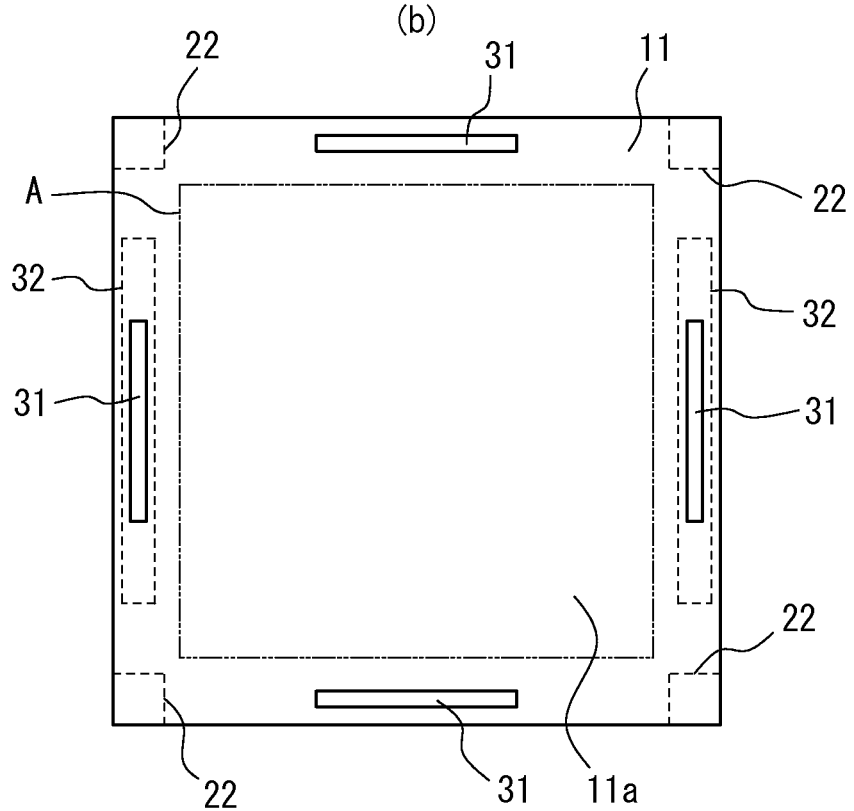
(b)

MULTI-MODE TACTILE SENSATION PROVIDING DEVICE

CROSS-REFERENCE TO RELATED APPLICATION

This application claims priority to and the benefit of Japanese Patent Application No. 2011-210895 filed Sep. 27, 2011, the entire contents of which are incorporated herein by reference.

TECHNICAL FIELD

The present invention relates to a device for detecting operation input to a touch sensor and providing a tactile sensation.

BACKGROUND

In recent years, some mobile terminals such as cellular phones include an input device provided with a touch panel, touch switch, or other such touch sensor as an input device for detecting operation input by a user via an operation unit, switches, or the like. Input devices provided with a touch sensor are in wide use apart from mobile terminals as well, in information devices such as calculators or ticket vending machines, household appliances such as microwave ovens, televisions, or lighting appliances, industrial devices (factory automation equipment), and the like.

A variety of types of such touch sensors are known, such as a resistive film type, capacitive type, optical type, or the like. All of these types of touch sensors, however, simply detect contact by a finger, stylus pen, or the like. Upon being contacted, the touch sensor itself is not physically displaced like a mechanical push-button switch.

Since the touch sensor itself is not physically displaced even when contacted, the operator cannot receive any feedback regarding input even when the input device detects contact. Therefore, the operator acquires no sense of operation of a "push/release of a push" when providing operation input and is likely to provide input repeatedly by contacting the same position over and over, which may be stressful for the operator.

In order to prevent such unnecessary repetitive input, some devices for example generate a sound upon detecting contact. Other known devices allow for auditory or visual confirmation of the result of operation input via, for example, a change in the display state, such as a change in the display color of an input object (referred to below simply as an "object"), such as an input button, displayed as an image on a display unit in correspondence with the input position.

In the case of auditory feedback, however, confirmation becomes difficult in a noisy environment, and such feedback is not feasible if the device in use is muted, as during silent mode or the like. Furthermore, with visual feedback, if the size of the object displayed on the display unit is small, the operator may not be able to confirm the change in display state, particularly when input is provided by finger and the object is blocked from view by the finger.

To address this issue, a feedback method that is neither auditory nor visual but rather causes the touch sensor to vibrate when the touch sensor detects operation input, thus transmitting vibration to the operator's fingertip or the like, has also been proposed (for example, see Patent Literature 1 and 2).

CITATION LIST

Patent Literature 1: JP2003-288158A
Patent Literature 2: JP2008-130055A

SUMMARY

With the techniques disclosed in Patent Literature 1 and 2, vibration can be transmitted to the operator's fingertip or the like upon detection of operation input to the touch sensor. Accordingly, an operator performing input using such an input device can confirm that operation input provided to the touch sensor has been detected by the input device.

Furthermore, by applying these techniques to an input device, it is also possible, by using position information from the touch sensor, to generate vibration only when operation input is provided to the touch sensor at a position corresponding to the position on the display unit at which an image of an object, such as an input button, is displayed. In other words, it is possible not to generate vibration when the touch sensor is contacted at a position where no object, such as a key or button, exists, yet to provide a tactile sensation by generating vibration when the touch sensor is contacted at a position where an object, such as a key or button, does exist.

The techniques disclosed in Patent Literature 1 and 2, however, merely vibrate the touch sensor upon the touch sensor simply detecting contact. Therefore, especially when a button switch such as a mechanical push-button switch (push-type button switch) is rendered on the touch sensor, a tactile sensation ends up being provided when a finger or the like lightly contacts (touches) the panel. Accordingly, at a point when the operator only lightly contacts (touches) the touch sensor before actually pushing the touch sensor, the touch sensor responds, which may lead to an erroneous operation. Moreover, even when the operator has no intention to push a depicted button switch (i.e. even when the operator is not pushing with force), a tactile sensation is provided in response to light contact (touch) before the touch sensor is actually pushed. Therefore, the operator is provided with a feeling of strangeness.

In the case of a mechanical push-button switch, the operator should expect that when pushing the switch by applying a certain degree of pressure, a tactile sensation of the switch having been pushed (referred to below as a click sensation) will be provided. Similarly, in the case of a mechanical push-button switch, the operator expects that while reducing the applied pressure, a tactile sensation of the switch that was being pushed returning to the original state of not being pushed (referred to below as a release sensation) will be provided. Furthermore, in the case of a mechanical push-button switch, the operator expects that neither the click sensation nor the release sensation will be provided when contacting or tracing a pressure position with an extremely weak pressure.

Therefore, the applicant invented an input device that, upon detecting slide input using a touch sensor, can present a tactile sensation just as when a key or the like configured with a mechanical switch is operated, and the applicant has already filed an application for this invention with the Japan Patent Office (JP2011-048685A).

By adding, to the input device, a pressure detection unit that detects pressure on a touch face of a touch sensor, a tactile sensation providing unit provides a tactile sensation when data based on pressure detected by the pressure detection unit (such as a voltage value detected by a piezoelectric element) satisfies a predetermined standard, i.e. when pressure is applied to the touch sensor. Accordingly, it is possible for this input device not to present a tactile sensation when operation input is detected by light contact not intended by the operator. Furthermore, by providing a tactile sensation to the operator by imparting a sense of pressure, this input device can provide a realistic tactile sensation such as that provided when operating an actual push-button switch, a tactile sensation which previous devices could not provide.

While the above-described input device achieves the remarkable effect of providing a realistic tactile sensation, it requires power to detect pressure, since the pressure detection unit is added. Furthermore, since the tactile sensation providing unit is also added to this input device, power is also necessary to drive this unit and provide the tactile sensation. In order to detect pressure, the power for activating the pressure detection unit can be set to a power that is not too large, i.e. a sort of standby power. On the other hand, as long as operation is in an input mode that provides the tactile sensation, the power for the tactile sensation providing unit to provide the tactile sensation is consumed each time operation input by the operator is detected and the tactile sensation is provided. Therefore, even if the power for providing the tactile sensation one time is not significant, when the input device continuously detects operation input and provides the tactile sensation, the consumed power increases considerably if operation input occurs a considerable number of times. Accordingly, in such an input device, the consumed power increases to some extent as compared to an input device with a regular touch panel not provided with a pressure detection unit or a tactile sensation providing unit.

If the input device can receive a supply of power from an external source, then setting aside ecological considerations, no particular problem arises even if the consumed power increases slightly. However, notably when battery capacity is limited, as in a mobile terminal, it can be assumed that battery power is consumed by repeatedly presenting a tactile sensation in order to enhance the sense of operation, thereby shortening the operating time of the terminal as a whole. Furthermore, since the operator normally does not know how much power is being consumed by the provision of a tactile sensation, the operator cannot easily predict the extent to which the remaining amount of the battery will be affected by the presentation of a tactile sensation. In these conditions as well, when the remaining amount of the battery is low, it can be assumed that the operator will generally wish to prioritize extended operation of the terminal in use over the sense of operation achieved by providing the tactile sensation. In this way, for example in the case of an input device provided in a mobile terminal or the like, it is necessary to take into consideration the desire for balance between the provision of a realistic tactile sensation and the operating time of the battery in the input device itself.

The present invention has thus been conceived in light of the above circumstances and provides a tactile sensation providing device that can achieve a balance between the operating time of a battery and the provision of a realistic tactile sensation upon detecting operation input to a touch sensor.

A tactile sensation providing device according to a first aspect of the present invention includes: a touch sensor; a pressure detection unit configured to detect pressure on a touch face of the touch sensor; a tactile sensation providing unit configured to vibrate the touch face; a battery information acquisition unit configured to acquire information on a battery; and a control unit configured to switch between a first input mode (touch panel input mode), in which the control unit, upon the touch sensor detecting contact, executes predetermined processing, and a second input mode (haptic input mode), in which the control unit, upon data based on pressure detected by the pressure detection unit satisfying a predetermined standard while the touch sensor is detecting contact, controls the tactile sensation providing unit to provide a tactile sensation to a pressing object pressing against the touch face and executes predetermined processing, such that the control unit switches between the first input mode and the second input mode based on the information on the battery acquired by the battery information acquisition unit.

A second aspect of the present invention is the tactile sensation providing device according to the first aspect, such that during operation in the second input mode (haptic input mode), when determining that a remaining amount of the battery no longer satisfies a predetermined threshold, the control unit switches from the second input mode to the first input mode (touch panel input mode).

A third aspect of the present invention is the tactile sensation providing device according to the first aspect, such that during operation in the first input mode (touch panel input mode), when determining that a remaining amount of the battery satisfies a predetermined threshold, the control unit switches from the first input mode to the second input mode (haptic input mode).

A fourth aspect of the present invention is the tactile sensation providing device according to any one of the first through third aspects, further including a display unit, such that the control unit controls the display unit to display an indication of a switch between the first input mode and the second input mode.

According to the present invention, it is possible to achieve a balance between the operating time of the input device by battery and the provision of a realistic tactile sensation upon detecting operation input to the touch sensor.

BRIEF DESCRIPTION OF DRAWINGS

The present invention will be further described below with reference to the accompanying drawings, wherein:

FIG. 2 illustrates an exemplary housing structure for the tactile sensation providing device according to an embodiment of the present invention;

DESCRIPTION OF EMBODIMENTS

The following describes the present embodiment with reference to the drawings.

Figure 1:
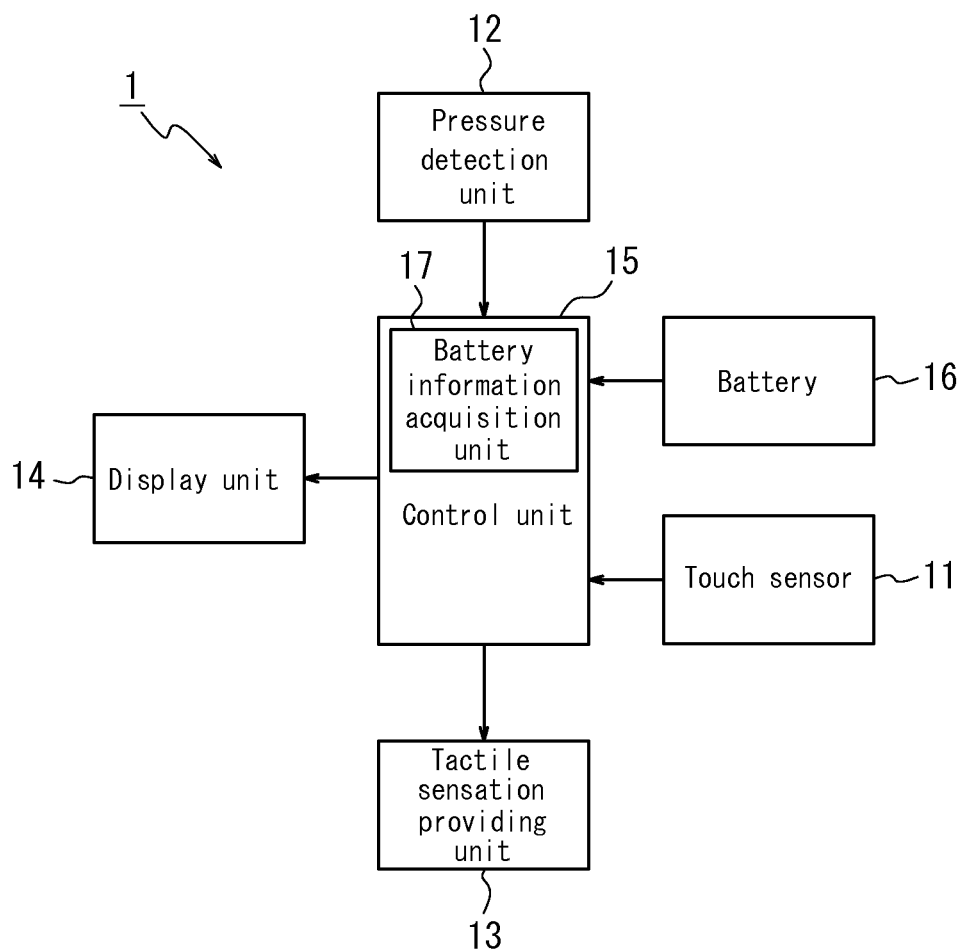
FIG. 1 is a block diagram schematically illustrating the configuration of a tactile sensation providing device according to an embodiment of the present invention.

FIG. 1 is a functional block diagram schematically illustrating the configuration of a tactile sensation providing device according to an embodiment of the present invention. The tactile sensation providing device according to the present embodiment may be applied to any input device that uses a touch sensor to detect contact by an operator, such as an input device used by an operator to input characters or numbers in a mobile terminal, an input device used in an ATM at a bank or a ticket vending machine at a station, or the like.

As illustrated in FIG. 1, a tactile sensation providing device 1 according to the present embodiment includes a touch sensor 11, a pressure detection unit 12, a tactile sensation providing unit 13, a display unit 14, a control unit 15, and a battery 16.

The touch sensor 11 is normally provided on the front face of the display unit 14 and detects contact, with a corresponding touch face of the touch sensor 11, by the operator's finger, a stylus, or the like on an object such as a key or button (referred to below simply as "key or the like") displayed on the display unit 14. The touch sensor 11 is of a known type, such as a resistive film type, a capacitive type, an optical type, or the like. Note that in order for the touch sensor 11 to detect contact, it is not essential for the operator's finger or the like to physically contact the touch sensor 11. For example, if the touch sensor 11 is an optical type, the touch sensor 11 detects the position at which an infrared ray on the touch sensor 11 is blocked by a finger or the like. Therefore, it is not necessary that an operator's finger or the like contact the touch sensor 11.

The pressure detection unit 12 detects pressure on the touch face of the touch sensor 11 when the user performs an operation and is, for example, configured using a device or the like such as a strain gauge sensor, a piezoelectric element, or the like that experiences a change in physical or electrical characteristics (strain, resistance, voltage, or the like) in response to pressure. When the pressure detection unit 12 is configured using a piezoelectric element, for example, the magnitude of the voltage (voltage value (referred to below as data based on pressure)), which is an electrical characteristic, of the piezoelectric element changes in accordance with the magnitude of the load (force) of the pressure on the touch sensor 11 (or the speed at which the magnitude of the load (force) changes (acceleration)). When the data based on pressure is equal to or greater than a predetermined threshold, the control unit 15 executes control for predetermined processing based, for example, on an application.

The control unit 15 acquires the data based on pressure by the pressure detection unit 12 notifying the control unit 15 of the data based on pressure, or by the control unit 15 detecting data based on pressure of the pressure detection unit 12. In other words, the control unit 15 acquires data based on pressure on the touch sensor 11 from the pressure detection unit 12. Note that instead of a voltage value, the data based on pressure may be power, resistance, magnitude of the load, or the like related to the pressure.

The pressure detection unit 12 may measure the change in the gap between the touch sensor 11 and the display unit 14 occurring when the user presses the touch sensor 11. In this case, the data based on pressure corresponds to the value of the change in the gap. Alternatively, the pressure detection unit 12 may measure the change in the gap between the touch sensor 11 and other components, such as a circuit board.

Furthermore, the pressure detection unit 12 can be configured in accordance with the contact detection type of the touch sensor 11. For example, if the touch sensor 11 is a resistive film type, a configuration without a strain gauge sensor, piezoelectric element, or the like may be adopted by associating the magnitude of the resistance that corresponds to the size of the contact area with the load (force) of the pressure on the touch face of the touch panel. Alternatively, if the touch sensor 11 is a capacitive type, a configuration without a strain gauge sensor, a piezoelectric element, or the like may be adopted by associating the magnitude of the capacitance with the load (force) of the pressure on the touch panel.

The tactile sensation providing unit 13 vibrates the touch face of the touch sensor 11. The tactile sensation providing unit 13 is configured using, for example, a piezoelectric element or the like. With the tactile sensation providing unit 13, vibration can be transmitted to the object contacting the touch sensor 11. Furthermore, the tactile sensation providing unit 13 can be configured to vibrate the touch face of the touch sensor 11 indirectly by transmitting vibration to the tactile sensation providing device 1 with a vibration motor (eccentric motor) or the like.

By vibrating the tactile sensation providing unit 13 in response to pressure detected by the pressure detection unit 12 (pressure on the touch sensor 11), the tactile sensation providing unit 13 can generate vibration and provide a tactile sensation to the user's finger or the like, thereby providing the user pressing the touch sensor 11 with a sensory understanding that an operation has been performed. The pressure detection unit 12 may be configured integrally with the tactile sensation providing unit 13. In greater detail, when the pressure detection unit 12 and the tactile sensation providing unit 13 are both configured using a piezoelectric element, these units may be configured to share a common piezoelectric element as a pressure detection and tactile sensation providing unit. The reason is that a piezoelectric element generates voltage when pressure is applied and deforms upon application of voltage.

The tactile sensation providing unit 13 can also be configured to generate vibration by driving a piezoelectric element that also serves as the pressure detection unit 12 when the magnitude of the voltage (voltage value (data)) of the piezoelectric element satisfies a predetermined threshold (when the touch sensor 11 is pressed). Stating that the magnitude of the voltage (voltage value (data)) of the piezoelectric element satisfies a predetermined standard may refer to the voltage value (data) reaching a predetermined standard, to the voltage value (data) exceeding a predetermined standard, or to detection of a voltage value (data) equivalent to a predetermined standard.

The display unit 14 displays an input button, such as a push-button switch (push-type button switch), or other such object and is configured using, for example, a liquid crystal display (LCD), an organic EL display, or the like. In addition to providing display corresponding to applications, the display unit 14 renders a user interface, formed by keys or buttons for detecting an operation by the operator on the touch sensor 11, in a predetermined display region.

The control unit 15 controls and manages operations of the entire tactile sensation providing device 1. The battery 16 provides power for operating the entire tactile sensation providing device 1. In order to provide power for operating the tactile sensation providing device 1, the battery 16 can store power by being charged in advance. In the present embodiment, the explanation focuses particularly on when the touch sensor 11 detects the position of contact by the operator, the pressure detection unit 12 detects pressure on the touch face of the touch sensor 11, and the battery 16 provides power necessary for the tactile sensation providing unit 13 to provide a predetermined tactile sensation. The control unit 15 includes therein a battery information acquisition unit 17. By detecting the voltage, for example, of the battery 16, the battery information acquisition unit 17 can acquire information related to the remaining amount of the battery 16 or the like.

FIG. 2 illustrates an exemplary housing structure for the tactile sensation providing device 1 illustrated in FIG. 1. FIG. 2(a) is a cross-sectional diagram of the main parts, and FIG. 2(b) is a plan view of the main parts. The display unit 14 is held and stored within a housing 21. The touch sensor 11 is held above the display unit 14 via insulators 22 made from an elastic member. The tactile sensation providing device 1 according to the present embodiment is rectangular in plan view of the display unit 14 and the touch sensor 11. In the present embodiment, the touch sensor 11 is held above the display unit 14 via four insulators 22 provided respectively at the four corners, away from a display region A of the display unit 14 illustrated in FIG. 2(b) by phantom lines.

In the housing 21, an upper cover 23 is provided so as to cover a surface region of the touch sensor 11 away from the display region of the display unit 14. An insulator 24 made from an elastic member is provided between the upper cover 23 and the touch sensor 11.

The touch sensor 11 illustrated in FIG. 2 has a surface member, configured for example with a transparent film or glass, which includes a touch face 11a and has a rear face member configured with glass or acryl. The touch sensor 11 is configured so that when the touch face 11a is pressed, the pressed part bends (strains) slightly in response to the pressing force, or the entire structure bends slightly.

A strain gauge sensor 31 for detecting a load (pressure) applied to the touch sensor 11 is provided, via adhesive or the like, on the surface of the touch sensor 11 near each side covered by the upper cover 23. A piezoelectric vibrator 32 for vibrating the touch sensor 11 is provided, via adhesive or the like, near each of two opposing sides on the rear face of the touch sensor 11. In other words, in the tactile sensation providing device illustrated in FIG. 2, the pressure detection unit 12 in FIG. 1 is configured using four strain gauge sensors 31, and the tactile sensation providing unit 13 in FIG. 1 is configured using two piezoelectric vibrators 32. The tactile sensation providing unit 13 vibrates the touch face 11a by vibrating the touch sensor 11. Note that the housing 21, upper cover 23, and insulator 24 illustrated in FIG. 2(a) are omitted from FIG. 2(b).

Next, the two input modes in the present embodiment are described. In the present embodiment, a conventional style input mode for executing predetermined processing by detecting contact using only the touch sensor 11 is referred to as "touch panel input mode". In the present embodiment, an input mode for executing predetermined processing by detecting both contact and predetermined pressure by a combination of the functions of the touch sensor 11 and the pressure detection unit 12 is referred to as "haptic input mode".

Figure 3:
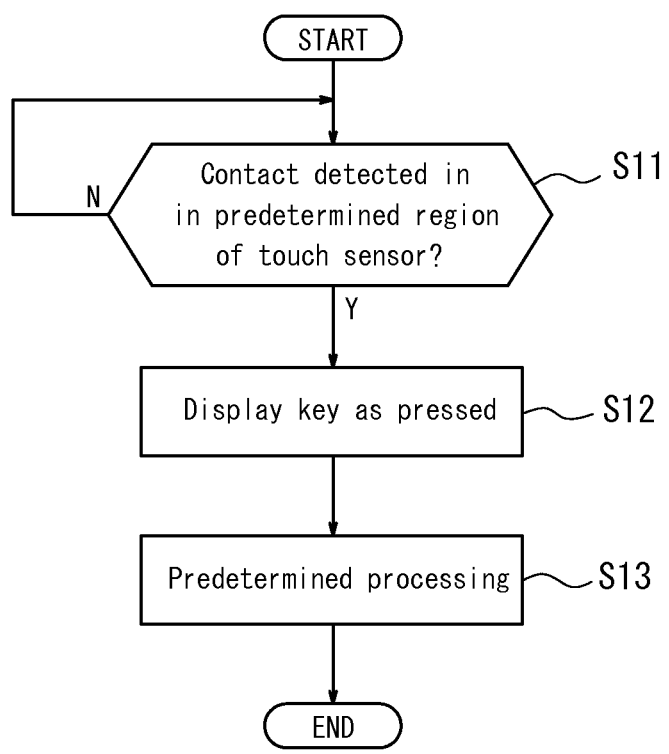
FIG. 3 is a flowchart illustrating processing by an embodiment of the present invention when detecting operation input in touch panel input mode.

FIG. 3 is a flowchart illustrating processing when executing predetermined processing in the above-described "touch panel input mode". The flowchart in FIG. 3 shows operations for providing a tactile sensation and executing predetermined processing when the tactile sensation providing device 1 detects contact and the contact is at a position corresponding to an object such as a key or the like. When starting the operations illustrated in the flowchart in FIG. 3, before detecting contact on the touch face of the touch sensor 11, an object such as a key or the like is displayed on the display unit 14 of the tactile sensation providing device 1. An object in the present embodiment can be an image that suggests, to the operator, a region for which operation input is detected. For example, as the image for an object, an image representing a key or the like having a number or character rendered on the key top is displayed on the display unit 14.

In the tactile sensation providing device 1 according to the present embodiment, upon the start of operations for detecting operation input in "touch panel input mode", the control unit 15 monitors operation input to the touch sensor 11. The processing in FIG. 3 starts at the point at which contact by the operator is detected on the touch face of the touch sensor 11.

In step S11, when the touch sensor 11 detects contact by a pressing object such as the operator's finger, a stylus pen, or the like in a predetermined region on the touch sensor 11 corresponding to a region in which an object is displayed on the display unit 14, the control unit 15 executes processing from step S12 onwards. In the present embodiment, the "predetermined region" refers to a region of the touch sensor 11 corresponding to the position where an object for which operation input is detected, such as a key or button, is displayed on the display unit 14. This "predetermined region" is a region corresponding to a key or the like and therefore is referred to below simply as a "key region" as appropriate.

When the contact position detected in step S11 is within the key region, the control unit 15 changes the display state of the object corresponding to the position at which contact has been detected and displays the object on the display unit 14 (step S12). In step S12, the change in the display state of the object can be executed by, for example, changing the rendered object to resemble a depressed key when the operator presses a mechanical push-button switch (referred to below as the "pressed display" of a key). The change in the display state of the object can also be executed by emphasizing that contact by the operator has been detected by, for example, momentarily changing the color, brightness, or the like of the object.

Once the pressed display of a key is performed in step S12, the control unit 15 executes predetermined processing in accordance with a procedure set in advance (step S13). The "predetermined processing" in step S13 refers to processing that is prescribed in advance and is allocated to the object for which contact was detected. For example, when the object for which contact was detected is a key for character input, the control unit 15 executes processing to output (display) the character. When the object for which contact was detected is an execution key for some function, the control unit 15 executes processing to start execution of the function.

The above-described processing in touch panel input mode can be executed in the same way as conventional style processing for an input device, provided with a regular touch sensor, to detect contact by the operator, notify the operator by display, vibration, or the like that the contact has been detected, and execute processing related to the contact. Note that in the present embodiment, when executing predetermined processing in "touch panel input mode", the processing described below to provide a tactile sensation by vibrating the tactile sensation providing unit 13 is not executed. In other words, in "touch panel input mode", no tactile sensation is provided even when operation input is detected. However, it is possible to indicate that contact by the operator has been detected properly via display on the display unit 14 as described above, by outputting a sound effect from an audio output unit (not illustrated), or the like.

Figure 4:
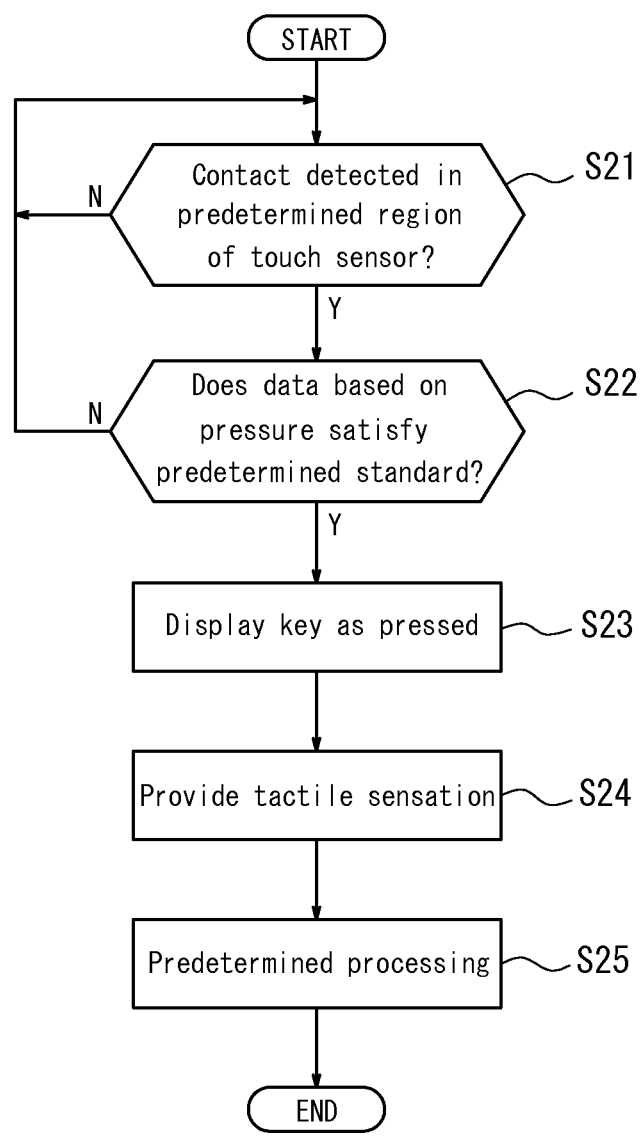
FIG. 4 is a flowchart illustrating processing by an embodiment of the present invention when detecting operation input in haptic input mode.

FIG. 4 is a flowchart illustrating processing when executing predetermined processing in the above-described "haptic input mode". The flowchart FIG. 4 shows operations for providing a tactile sensation and executing predetermined processing when the tactile sensation providing device 1 has not yet executed predetermined processing at the point at which contact is detected, the contact is at a position corresponding to a key or the like, and data based on pressure detected by the pressure detection unit 12 satisfies a predetermined standard. When starting the operations illustrated in the flowchart in FIG. 4 as well, before detecting contact on the touch face of the touch sensor 11, an object such as a key or the like is displayed on the display unit 14 of the tactile sensation providing device 1.

In the tactile sensation providing device 1 according to the present embodiment, upon the start of operations for detecting operation input in "haptic input mode", the control unit 15 monitors operation input to the touch sensor 11 and monitors data based on pressure detected by the pressure detection unit 12. The processing in FIG. 4 also starts at the point at which contact by the operator is detected on the touch face of the touch sensor 11.

In step S21, when the touch sensor 11 detects contact by a pressing object such as the operator's finger, a stylus pen, or the like in the key region, the control unit 15 executes processing from step S22 onwards.

In step S22, the control unit 15 determines whether the data based on pressure detected by the pressure detection unit 12 satisfies a predetermined standard while increasing due to pressure on the touch sensor 11 by the operator. The pressure detection unit 12 detects, for example, a load from the average value of the output of the four strain gauge sensors 31. With regard to the data based on pressure satisfying a predetermined standard, data corresponding to a voltage value equivalent to a load or value of 1 N (newton), for example, is preferably set in advance based on pressure when an operator performs a normal push operation, and the setting can preferably be changed subsequently. In order to prevent the start of predetermined processing when the operator performs light, unintentional contact, and in order to impart a sense of pressure to the operator for a realistic tactile sensation as described below, the predetermined standard is not set excessively low, taking into consideration the pressure at the time of intentional pressure input by the operator (for example, an average value or the like). Even when contact on the key region of the touch sensor 11 is detected in step S21, if data based on pressure detected by the pressure detection unit 12 in step S22 does not satisfy the predetermined standard, the control unit 15 returns to step S21 and continues processing.

If the data based on pressure detected in step S22 satisfies the predetermined standard, the control unit 15 changes the display state of the object corresponding to the position at which contact has been detected and displays the object on the display unit 14 (step S23). In step S23, the change in display state of the object may be executed in the same way as in step S12 described above.

When the pressed display of a key is performed in step S23, the control unit 15 drives the tactile sensation providing unit 13 with a predetermined drive signal to provide a tactile sensation by vibrating the touch sensor 11 in a predetermined vibration pattern set in advance (step S24). The tactile sensation providing unit 13 for example drives the two piezoelectric vibrators 32 in phase. In this way, in the "haptic input mode", the tactile sensation providing device 1 detects operation input and starts predetermined processing by a push operation based on the operator's intent.

Note that the tactile sensation provided by the tactile sensation providing unit 13 to the pressing object in step S24 is preferably the above-described click sensation. In order to provide a realistic click sensation to the operator, the tactile sensation providing device 1 stimulates the operator's sense of touch while stimulating the sense of pressure by performing operations such as the following. For example, the control unit 15 stimulates the sense of pressure until the data based on pressure applied to the touch sensor 11 satisfies a standard for providing a tactile sensation (for example, a standard corresponding to data based on pressure of 1 N). Once the data based on pressure satisfies the standard, the control unit 15 stimulates the sense of touch by driving the piezoelectric vibrators 32 with a predetermined drive signal to vibrate the touch face 11*a*. In this way, the tactile sensation providing device 1 can provide the operator with a click sensation similar to that obtained when pushing a button switch such as a push-button switch (push-type button switch). Accordingly, the operator does not suffer a feeling of strangeness, since even when a push-button switch is rendered on the touch sensor, the operator can provide operation input to the touch sensor 11 while obtaining a realistic click sensation similar to that obtained when operating an actual push-button switch. Moreover, since the operator can provide the operation input in conjunction with the perception of "having pressed" the touch sensor 11, erroneous input caused by simply contacting the touch sensor 11 can be prevented.

The drive signal for providing the above-described click sensation, i.e. the fixed frequency, cycle (wavelength), waveform, and amplitude for stimulating the sense of touch can be set appropriately in accordance with the click sensation to be provided. For example, to provide a click sensation as representatively provided by a metal dome switch used in a mobile terminal, the tactile sensation providing unit 13 is driven by one period of a drive signal composed, for example, of a sine wave with a fixed frequency of 170 Hz. The tactile sensation providing unit 13 is driven with such a drive signal, and with the data based on pressure satisfying the predetermined standard, the touch face 11*a* is vibrated approximately 15 μm. As a result, the operator can be provided with a realistic click sensation as when clicking an actual key.

Once the tactile sensation is provided in step S24, the control unit 15 executes predetermined processing in accordance with a procedure set in advance (step S25). The "predetermined processing" in step S25 is the same as the predetermined processing described in step S13.

With the above-described processing in haptic input mode, unlike an input device provided with a regular touch sensor, when data based on pressure satisfies a predetermined standard while contact by the operator is being detected, a realistic tactile sensation, such as that of a push-button switch being pushed, is provided.

Next, input detection processing in the present embodiment is described. In the present embodiment, a state is described in which operation input by the operator is detected in one of two preset input modes, touch panel input mode and haptic input mode, when the tactile sensation providing device 1 is activated, such as when power to the tactile sensation providing device 1 is turned on. The tactile sensation providing device 1 of the present embodiment can execute processing corresponding to detected operation input by detecting contact and/or pressure by the operator in the set touch panel input mode or haptic input mode.

Figure 5:
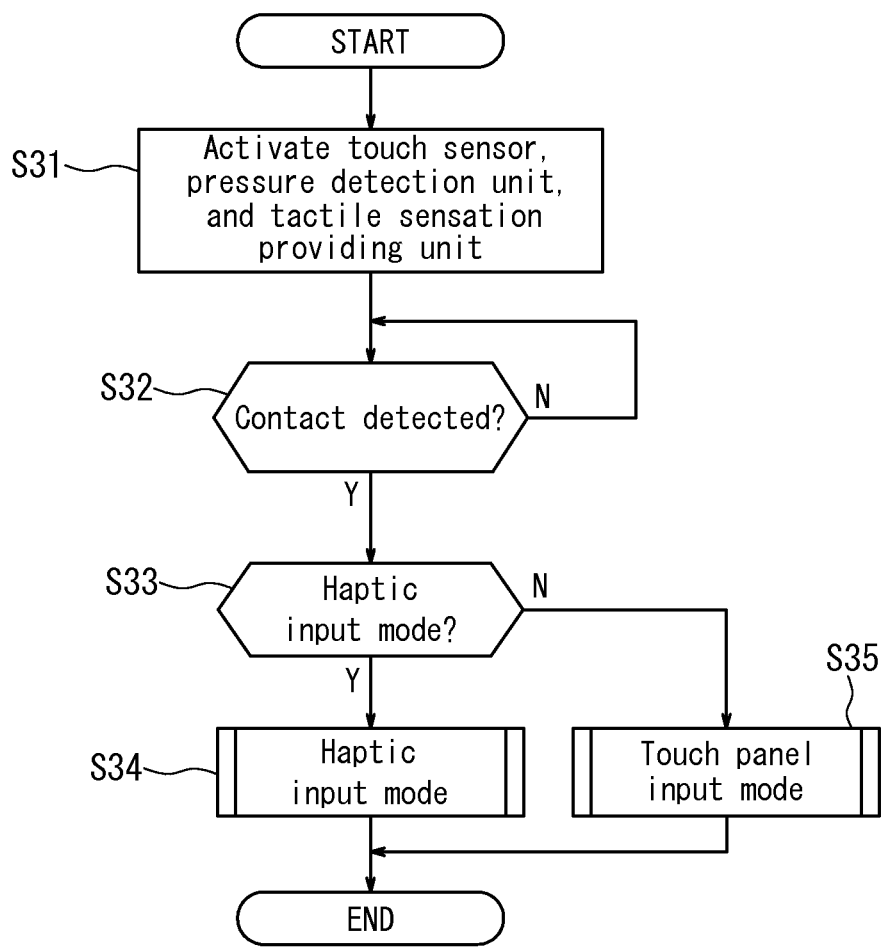
FIG. 5 is a flowchart illustrating processing by the tactile sensation providing device according to an embodiment of the present invention when starting to detect operation input in touch panel input mode or haptic input mode.

FIG. 5 is a flowchart illustrating processing when starting input detection in touch panel input mode or haptic input mode at the time the tactile sensation providing device 1 is activated, such as when power is turned on. This processing can thus be started when the tactile sensation providing device 1 is activated, such as when the power is turned on.

Upon the start of this processing, such as when the power switch for the tactile sensation providing device 1 is turned on, the control unit 15 first activates the touch sensor 11, the pressure detection unit 12, and the tactile sensation providing unit 13 so that these functional units can operate at any time (step S31). In other words, preparations are made so that the touch sensor 11 can detect contact by the operator, scan the position at which the contact is detected, and notify the control unit 15. Preparations are also made so that the pressure detection unit 12 can detect pressure on the touch face of the touch sensor 11 and transmit data based on the pressure to the control unit 15. Furthermore, preparations are made so that the tactile sensation providing unit 13 can vibrate the touch face of the touch sensor 11 at any time upon being notified of control information by the control unit 15.

Once each functional unit is activated in step S31, the control unit 15 determines whether the touch sensor 11 has detected contact by the operator (step S32). In other words, in step S32, the control unit 15 determines whether the operator has provided some sort of operation input to the touch sensor 11.

When contact is detected in step S32, the control unit 15 determines whether the set input mode is haptic input mode (step S33). Subsequently, when the set input mode is haptic input mode, the input detection processing in haptic input mode described in FIG. 4 is executed (step S34). Conversely, when the set input mode is touch panel input mode, the input detection processing in touch panel input mode described in FIG. 3 is executed (step S35).

With the above processing, when the tactile sensation providing device 1 is activated and detection of operation input starts in either touch panel input mode or haptic input mode, operation input can be detected and processing corresponding to the operation input can be executed in the corresponding input mode.

However, when starting to detect operation input in haptic input mode, power consumption of the battery 16 for operation of the tactile sensation providing device 1 progresses, and if haptic input mode is maintained even when the remaining amount of the battery 16 is low, the power consumption of the battery 16 progresses more and more. If the power consumption of the battery 16 progresses in this way, it is assumed that the remaining amount of the battery 16 will become insufficient, making it impossible before long to maintain operation of the entire tactile sensation providing device 1. Therefore, in the present embodiment, the setting of the input mode is changed in accordance with the remaining amount of the battery.

Figure 6:
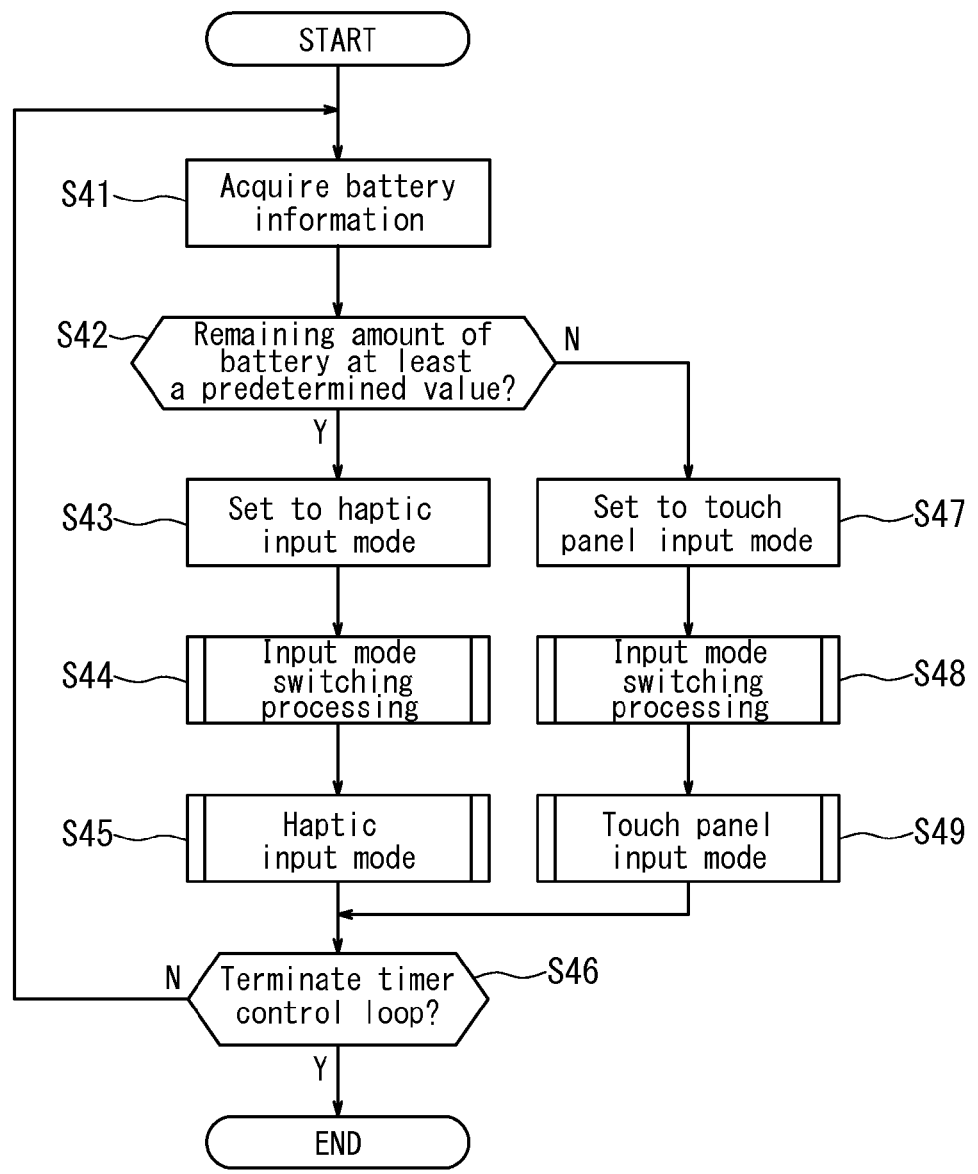
FIG. 6 is a flowchart illustrating input mode setting processing in accordance with the remaining amount of the battery in the present embodiment.

FIG. 6 is a flowchart illustrating input mode setting processing in accordance with the remaining amount of the battery in the present embodiment. The processing illustrated in FIG. 6 is processing to be started after execution of the processing in FIG. 5 is complete.

Upon starting the input mode setting processing in accordance with the remaining amount of the battery in the present embodiment, the battery information acquisition unit 17 of the control unit 15 acquires information related to the remaining amount of the battery 16 by, for example, detecting the voltage of the battery 16 (step S41). Once the information on the battery is acquired in step S41, the control unit 15 determines whether the remaining amount of the battery 16 satisfies a predetermined threshold based on the acquired battery information (step S42). Here, the "predetermined threshold" for the remaining amount of the battery 16 is a value such as the voltage that is set as the power charged in the battery 16 decreases due to the power related to operation of the tactile sensation providing device 1.

Figure 7:
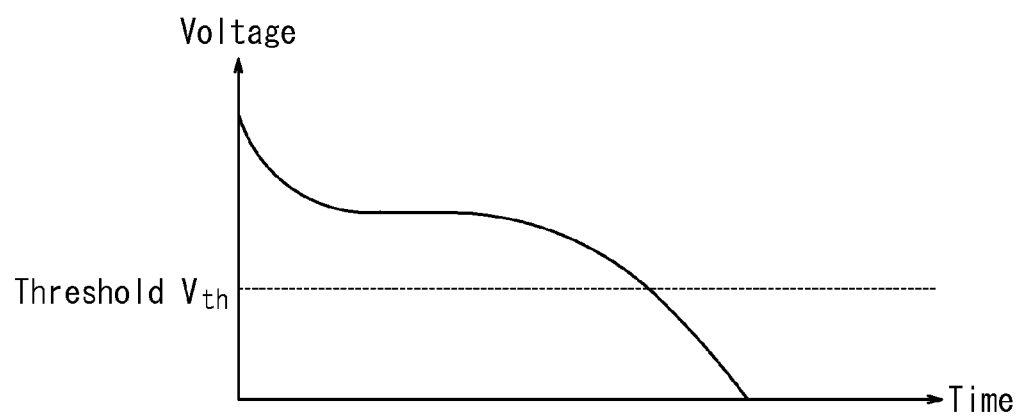
FIG. 7 illustrates an example of how the remaining amount of a rechargeable battery reduces when operating the tactile sensation providing device with a regular rechargeable battery.

FIG. 7 illustrates an example of how the remaining amount of a rechargeable battery reduces when the tactile sensation providing device 1 is operated with a regular rechargeable battery (battery 16). By continuing to operate the tactile sensation providing device 1, the power of the battery 16 is consumed, and therefore the curve illustrated in FIG. 7 gradually decreases. In FIG. 7, the decrease in battery voltage is shown as an example. The "predetermined threshold" for the remaining amount of the battery 16 in step S42 is set in advance based on a voltage value or the like at which operation of the tactile sensation providing device 1 will soon be impossible to maintain if the remaining amount of the battery 16 decreases any further in haptic input mode. For example, the voltage threshold Vth in FIG. 7 can be set as the "predetermined threshold" in step S42. Note that the "predetermined threshold" is preferably set based on a voltage value or the like at which operation of the tactile sensation providing device 1 can be maintained as before for a certain period of time if operations for providing a tactile sensation in haptic input mode are not performed (for example, if in touch panel input mode).

When the remaining amount of the battery 16 in step S42 still satisfies a predetermined threshold, the control unit 15 sets the input mode to "haptic input mode" (step S43) and executes the following input mode switching processing (step S44).

Figure 8:
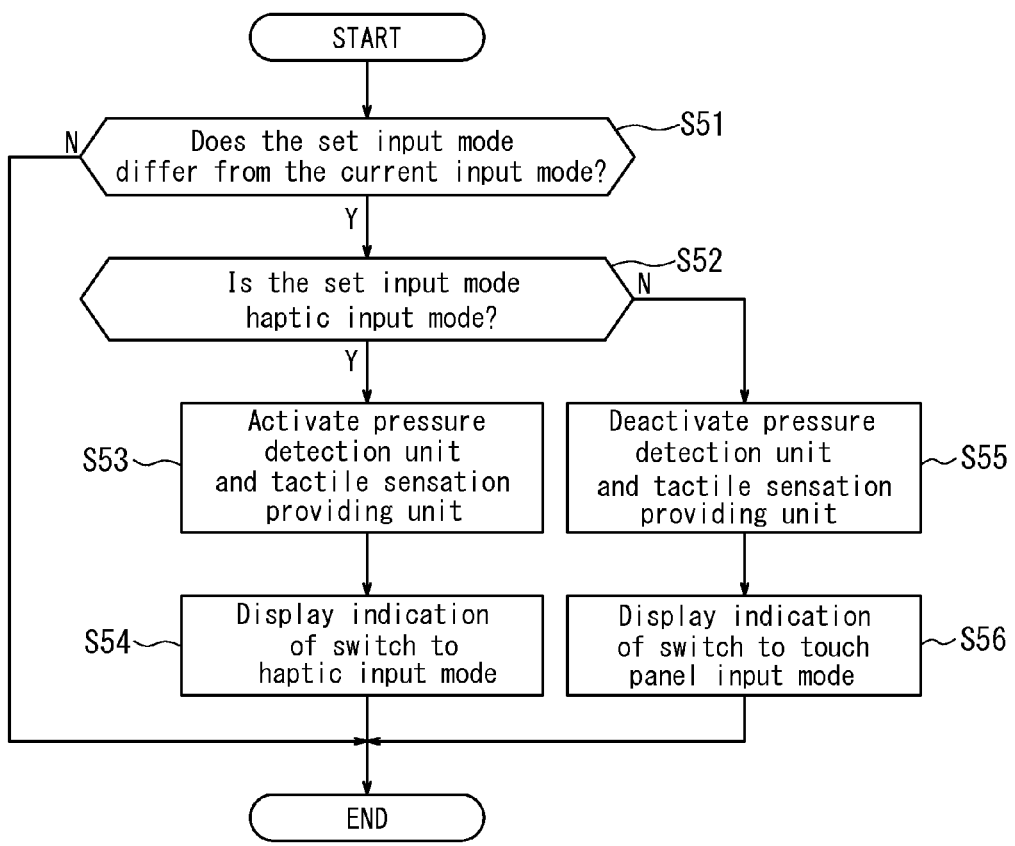
FIG. 8 is a flowchart illustrating details on input mode switching processing illustrated in FIG. 7.

FIG. 8 is a flowchart illustrating details on input mode switching processing illustrated in step S44 of FIG. 6. Upon the start of the input mode switching processing in FIG. 8, the control unit 15 determines whether the input mode set in an earlier step (step S43) differs from the current input mode (step S51). When operation was originally in haptic input mode and the set input mode is haptic input mode, there is no need to change the input mode, and therefore processing in FIG. 8 terminates (step S51: No).

When the input mode set in an earlier step (step S43) differs from the current input mode, however, the control unit 15 determines whether the set input mode is haptic input mode (step S52). In this case, since haptic input mode was set in step S43, the control unit 15 activates the pressure detection unit 12 and the tactile sensation providing unit 13 (step S53). Furthermore, the control unit 15 displays an indication that the input mode was switched to "haptic input mode" on the display unit 14 (step S54).

Upon completion of the input mode switching processing in FIG. 8 (step S44 in FIG. 6), the control unit 15 then executes, in step S45 of FIG. 6, the input detection processing in haptic input mode illustrated in FIG. 4. With the above processing, operation input detection processing in haptic input mode is executed when the remaining amount of the battery 16 is equal to or greater than the predetermined threshold.

Once the indication of the change to "haptic input mode" is displayed in step S54, i.e. after step S45 in FIG. 6, the control unit 15 returns to step S41 and continues processing while input mode setting processing in accordance with the remaining amount of the battery in the present embodiment is being executed (step S46). In the present embodiment, such input mode setting processing in accordance with the remaining amount of the battery may be set to be executed continuously. Alternatively, the input mode setting processing in accordance with the remaining amount of the battery may be executed, for example, as a "balance mode" or the like selected by the operator. In the present embodiment, while the input mode setting processing in accordance with the remaining amount of the battery is being executed, the control unit 15 controls the time for the processing illustrated in FIG. 6 to be executed with an internal timer or the like so that the processing is continued (step S46).

On the other hand, when the remaining amount of the battery 16 in step S42 is determined no longer to satisfy the predetermined threshold, the control unit 15 sets the input mode to "touch panel input mode" (step S47) and executes the following input mode switching processing (step S48).

In step S48 as well, the input mode switching processing in FIG. 8 is executed. Upon the start of the input mode switching processing in FIG. 8, the control unit 15 determines whether the input mode set in an earlier step (step S47) differs from the current input mode (step S51). When operation was originally in touch panel input mode and the set input mode is touch panel input mode, there is no need to change the input mode, and therefore processing in FIG. 8 terminates (step S51: No).

When the input mode set in an earlier step (step S47) differs from the current input mode, however, the control unit 15 determines whether the set input mode is haptic input mode (step S52). In this case, since touch panel input mode was set in step S47, the control unit 15 deactivates the pressure detection unit 12 and the tactile sensation providing unit 13 (step S55). Furthermore, the control unit 15 displays an indication that the input mode was switched to "touch panel input mode" on the display unit 14 (step S56).

When displaying the indication of the switch to "touch panel input mode" in step S56, a misunderstanding on the part of the operator can be avoided by further displaying an indication that "since the remaining amount of the battery is extremely low, pressure will not be detected, nor will a tactile sensation be provided".

Upon completion of the input mode switching processing in FIG. 8 (step S48 in FIG. 6), the control unit 15 then executes, in step S49 of FIG. 6, the input detection processing in touch panel input mode illustrated in FIG. 3. With the above processing, operation input detection processing in touch panel input mode is executed when the remaining amount of the battery 16 does not meet the predetermined threshold.

In this way, according to the present embodiment, during operation in haptic input mode, when it is determined via the battery information acquisition unit 17 that the remaining amount of the battery 16 no longer satisfies the predetermined threshold, the haptic input mode is switched to the touch panel input mode. Furthermore, according to the tactile sensation providing device 1 of the present embodiment, during operation in touch panel input mode, when it is determined via the battery information acquisition unit 17 that the remaining amount of the battery 16 satisfies the predetermined threshold as a result of charging or the like, the touch panel input mode is switched to the haptic input mode. Accordingly, from a state in which the remaining amount of the battery is low, if the remaining amount of the battery becomes sufficient due to charging or the like, the tactile sensation providing device 1 returns to providing a realistic tactile sensation.

As described above, according to the present invention, the touch panel input mode and the haptic input mode are switched between in accordance with the remaining amount of the battery. Therefore, according to the present invention, it is possible to achieve a balance between the operating time of the input device by battery and the provision of a realistic tactile sensation upon detecting operation input to the touch sensor. Therefore, when the remaining amount of the battery becomes low in the middle of providing operation input using the tactile sensation providing device, the operator can maintain maximum functionality of the input device without any particular conscious effort. Furthermore, by charging the battery when the remaining amount becomes low, the operator can once again cause a realistic tactile sensation to be provided when operation input to the touch sensor is detected.

The present invention is not limited only to the above embodiment, and a variety of modifications and changes may be made. For example, in the above-described embodiment, a click sensation is provided when data based on pressure detected by the pressure detection unit 12 satisfies a predetermined standard, whereas no particular mention has been made of a release sensation. Like the click sensation, however, the release sensation may be provided when the data based on pressure detected by the pressure detection unit 12 no longer satisfies a predetermined standard. If the click sensation and the release sensation are set to different tactile sensations, a tactile sensation that is even closer to an actual push-button switch can be provided, yet the click sensation and the release sensation may also be the same tactile sensation.

In the above-described embodiment, no particular mention has been made of whether audio is generated when an operation is performed. If audio is appropriately generated in conjunction with the operations of the above embodiment, however, the operability of the tactile sensation providing device can be further enhanced, and the occurrence of erroneous operations can be even further reduced.

In the above-described embodiment, an example has been described in which the tactile sensation providing device 1 executes predetermined processing when detecting contact (touch panel input mode) or when providing a tactile sensation upon data based on pressure satisfying a predetermined standard (haptic input mode). Alternatively, however, the tactile sensation may be provided and/or predetermined processing executed not when detecting contact or when data based on pressure satisfies a predetermined standard, but rather when detecting release of contact or when data based on pressure no longer satisfies a predetermined standard.

Furthermore, in the above-described embodiment, during operation of the tactile sensation providing device 1, the battery information acquisition unit 17 has been described as being in a state of endlessly detecting the voltage level or the like of the battery 16 (in accordance with the loop in FIG. 6). The battery information acquisition unit 17 may, however, acquire information related to the remaining amount of the battery 16 by detecting the voltage level or the like of the battery 16 at predetermined intervals. With this approach, the operating time of the tactile sensation providing device 1 can be expected to be lengthened even more.

The tactile sensation providing unit in the above-described embodiment may be configured using any number of piezoelectric vibrators, using a transparent piezoelectric element on the entire surface of the touch sensor, or by causing an eccentric motor to rotate once per period of a drive signal, as long as the eccentric motor can express vibration that presents a tactile sensation.

The tactile sensation providing device according to the present invention drives the tactile sensation providing unit when data based on pressure detected by the pressure detection unit satisfies a standard for providing a tactile sensation. Stating that the data based on pressure detected by the pressure detection unit satisfies a standard for providing a tactile sensation may refer to when data based on pressure detected by the pressure detection unit has reached a standard value for providing a tactile sensation or to when data based on pressure detected by the pressure detection unit has exceeded a standard value for providing a tactile sensation. Satisfying the standard may also refer to when data based on pressure corresponding to a standard value for providing a tactile sensation is detected by the pressure detection unit.

The above embodiment has been described assuming a configuration in which the touch sensor 11 is layered on the upper surface of the display unit 14. This configuration is not essential in the tactile sensation providing unit according to the present invention, and a configuration in which the touch sensor 11 and the display unit 14 are separated may be adopted. A configuration in which the touch sensor 11 is layered on the upper surface of the display unit 14, however, makes it easier for the operator to recognize the relationship between the displayed image and the generated vibration.

The display unit 14 and the touch sensor 11 described in the present embodiment may be configured as an integrated device by, for example, providing a common substrate with the functions of both the display unit and the touch sensor (contact detection unit). An example of such a device integrating the functions of both the display unit and the contact detection unit is a liquid crystal panel having a matrix of pixel electrodes, with a plurality of photoelectric conversion elements, such as photodiodes, regularly mixed therein. This device is contacted by a pen for touch input at a desired position on the panel display, and while displaying images with the liquid crystal panel structure, the device can detect the contact position by light from a backlight for liquid crystal display being reflected by the tip of the pen and received by surrounding photoelectric conversion elements.

REFERENCE SIGNS LIST

11: Touch sensor
11a: Touch face
12: Pressure detection unit
13: Tactile sensation providing unit
14: Display unit
15: Control unit
16: Battery
17: Battery information acquisition unit
21: Housing
22: Insulator
23: Upper cover
24: Insulator
31: Strain gauge sensor
32: Piezoelectric vibrator

The invention claimed is:

1. A tactile sensation providing device comprising:
a touch sensor;
a tactile sensation providing unit configured to vibrate a touch face of the touch sensor;
a battery information acquisition unit configured to acquire information on a battery; and
a control unit configured to switch between a first input mode, in which the control unit, upon the touch sensor detecting contact, executes predetermined processing without providing a tactile sensation to a pressing object pressing against the touch face, and a second input mode, in which the control unit, upon the touch sensor being pushed, controls the tactile sensation providing unit to provide the tactile sensation to a pressing object pressing against the touch face and executes the predetermined processing, wherein
the control unit switches between the first input mode and the second input mode based on the information on the battery acquired by the battery information acquisition unit, and
wherein during operation in the second input mode, when determining that a remaining amount of the battery no longer satisfies a predetermined threshold, the control unit switches from the second input mode to the first input mode.

2. The tactile sensation providing device according to claim 1, wherein during operation in the first input mode, when determining that a remaining amount of the battery satisfies a predetermined threshold, the control unit switches from the first input mode to the second input mode.

3. The tactile sensation providing device according to any one of claims 1 to 2, further comprising a display unit, wherein
the control unit controls the display unit to display an indication of a switch between the first input mode and the second input mode.

* * * * *